United States Patent
Hunter, Jr. et al.

(10) Patent No.: US 12,555,692 B2
(45) Date of Patent: Feb. 17, 2026

(54) REFLECTIVITY VARIATION OF ICF TARGET SURFACES (71) Applicant: INNOVEN ENERGY LLC, Colorado Springs, CO (US)

(72) Inventors: Robert O. Hunter, Jr., Aspen, CO (US); Adlai H. Smith, Escondido, CA (US)

(73) Assignee: Innoven Energy LLC, Colorado Springs, CO (US)

(*) Notice: Subject to any disclaimer, the term of this patent is extended or adjusted under 35 U.S.C. 154(b) by 451 days.

(21) Appl. No.: 16/003,885

(22) Filed: Jun. 8, 2018

(65) Prior Publication Data

US 2019/0057780 A1 Feb. 21, 2019

Related U.S. Application Data (60) Provisional application No. 62/546,440, filed on Aug. 16, 2017.

(51) Int. Cl.
*G21B 1/03* (2006.01)
*G21B 1/19* (2006.01)

(52) U.S. Cl.
CPC ........ *G21B 1/03* (2013.01); *G21B 1/19* (2013.01)

(58) Field of Classification Search
CPC .................................. G21B 1/03; G21B 1/19
USPC ................................................. 376/103, 104
See application file for complete search history.

(56) References Cited

U.S. PATENT DOCUMENTS

2012/0307950 A1* 12/2012 Sekine ............... G21B 1/19
376/103
2017/0287572 A1* 10/2017 Kley ..................... G21B 1/19

OTHER PUBLICATIONS

Rozanov, "Inertial confinement target physics", In Energy from inertial fusion, 1995. (Year: 1995).*
Girard, "Titanium and germanium lined hohlraums and halfraums as multi-keV x-ray radiators", Physics of Plasmas 16, No. 5 (2009). (Year: 2009).*
Shuldberg, "Gas Retention in Multilayer Alternate Ablator Capsules", Fusion Science and Technology 70, No. 2 (2016): 164-172. (Year: 2016).*
Swift, "Fusion targets", In Laser-Plasma Interactions, pp. 395-426. CRC Press, 2009. (Year: 2009).*
Lindl, "The physics basis for ignition using indirect-drive targets on the National Ignition Facility", Physics of plasmas 11, No. 2 (2004) : 339-491,.
Murakami, M. et al., Indirectly Driven Targets for Inertial Confinement Fusion, Nuclear Fusion, V. 31, pp. 1315-1331 (1991).

* cited by examiner

*Primary Examiner* — Jack W Keith
*Assistant Examiner* — Daniel Wasil
(74) *Attorney, Agent, or Firm* — Kilpatrick Townsend & Stockton LLP

(57) ABSTRACT

In a system and method for controlling energy deposition on a surface of an Inertial Confinement Fusion (ICF) target when imploding. Providing one or more volume absorber/radiators to absorb the incident beam and reradiate x-ray radiation within the hohlraum containing the ICF target. Varying the reflectivity of the inner wall of the hohlraum wall or outer surface of the ICF target. Further suppressing non-uniformities in the x-ray radiation emitted from the one or more volume absorber/radiators upon one or more materials located on an outer surface of the ICF target or inner surface of said hohlraum.

17 Claims, 15 Drawing Sheets

REFLECTIVITY VARIATION OF ICF TARGET SURFACES

CROSS-REFERENCE TO RELATED APPLICATION

This application claims the benefit of U.S. Provisional Application No. 62/546,440 filed on Aug. 16, 2017, which is incorporated herein by reference.

BACKGROUND

Inertial Confinement Fusion (ICF) is a process by which energy is produced by nuclear fusion reactions. The fuel pellet, generally called the target, is conventionally a spherical device which contains fuel for the fusion process. Lasers and ion beams have been considered for energizing and imploding the target. If the fuel contained in the target is sufficiently heated and compressed, a self-sustaining fusion reaction can occur.

The conventional approach to ICF target design is exemplified by the Department of Energy's program, National Ignition Facility ("NIF"). NIF target designs, as described in Lindl (Physics of Plasmas v11, number 2), consists of a mostly plastic or beryllium ablator region which surrounds a cryogenic DT ice, and a central void which is filled with very low density DT gas. The target is then placed in a cylindrical hohlraum. The entire target assembly (hohlraum and target) are then placed in the target chamber, and the hohlraum illuminated with a number (192) of discrete beams of laser light. The hohlraum then converts the energy to x-rays, which then ablate the ablator region, and by the reactive force, drives the DT inward. The combination of a non-spherical hohlraum and illumination leads directly to spatial non-uniformities in the target absorbed energy. Even in configurations with spherical hohlraums, the illumination is never spherically symmetric because entrance holes are required to admit the beams. This unsymmetrical illumination leads to unsymmetrical energy absorption by the target which in turn seeds instabilities that can prevent the temperature and density from achieving the necessary values to initiate a useful or self-sustaining fusion reaction.

SUMMARY

In ICF targets, the energy absorbed by the generally spherical target needs to be uniform at the $\sigma_{abs}^E/E_{abs} \leq 1\%$ level (RMS of absorbed energy divided by the absorbed energy) and in some arrangements «1%. In a hohlraum arrangement this is achievable with multiple incoming beams but adds additional requirements on laser or particle beam uniformity and further complicates the beam delivery system. It is the purpose of this invention to reduce $\sigma_{abs}^E/E_{abs}$ by trading off a multiplicity of beams for simpler illumination geometries by modifying some measureable properties of the target or hohlraum wall. It is recognized that feasible arrangements for production of power by ICF require energizing the target assembly over a relatively small solid angle (Tabak, 1997, UCRL-JC-128366 Rev 2, Design of a Distributed Radiator Target for Inertial Fusion Driven from Two Sides with Heavy Ion Beams). In commercial arrangements utilizing fusion power, the solid angle occupied by input beams (laser or particle) must necessarily be small and non-uniform so that the energy generated by a self-sustaining fusion reaction of the target can be efficiently absorbed by the reactor structure and because the target output (energy yielded by the fusion process) may be tailored to project energy into certain angular sectors that must be substantially free from beam entrance apertures.

SPECIFICATION

Figure 1A:
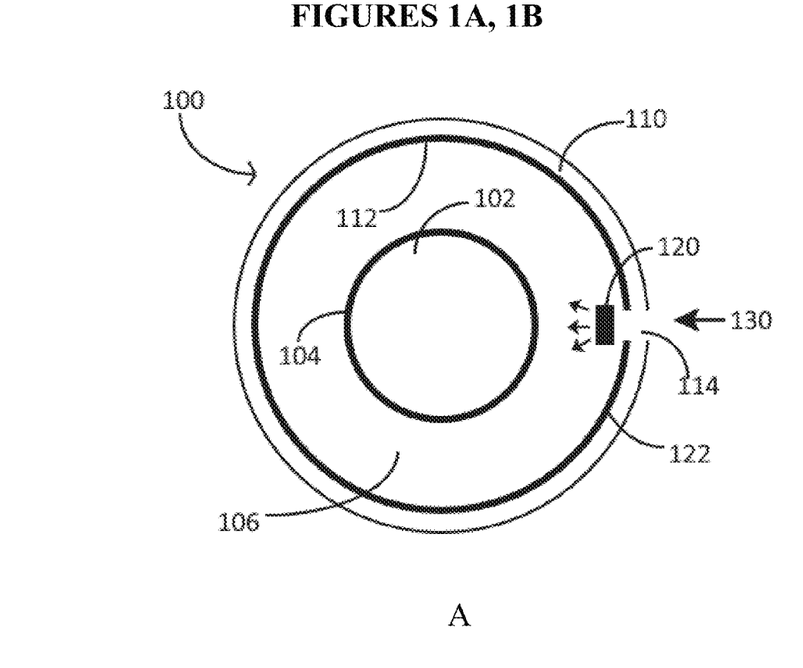
FIG. 1A shows a single narrow beam illumination of a target assembly consisting of a spherical target enclosed by a spherical hohlraum.

In a target assembly 100 (FIG. 1A), the energy absorbed per unit area on target surface 104 is:

$$E_{abs}(x) = (1 - R_{di}) * T_{i \leftarrow o}(1 - D_S)I_o \qquad (1)$$

where $R_{di}$ is the diffuse reflectivity of target surface 104, $T_{i\leftarrow o}$ is the radiation transfer operator from inner wall 112 of hohlraum 110 to the outer surface 104 of target 102, $D_S$ is the round trip scattering operator, and $I_o$ the externally incident intensity on inner hohlraum wall 112. The combined operator $T_{i\leftarrow o}/(1-D_S)$ represents multiple scattering or rattling around of radiation between target 102 and hohlraum 110 and tends to spatially homogenize the radiation field. Consequently, varying the reflectivity of the hohlraum wall has less effect on the spatial uniformity of $E_{abs}(\vec{x})$ than varying the reflectivity of target surface 104. For the same reason, spatial variation of $R_{do}$ (diffuse reflectivity of hohlraum surface 112) does not substantially degrade the homogenization effect of operator $T_{i\leftarrow o}/(1-D_S)$. Based on this observation, to leading order the change in $R_{di}$ ($\Delta R_{di}$) required to null out any non-uniformity in $E_{abs}(x)$, $\Delta E_{abs}(x) = E_{abs}(x) - \langle E_{abs} \rangle$ is $$\Delta R_{di} = (1-R_{di}) * \Delta E_{abs}/\langle E_{abs} \rangle \quad (2)$$

where $\langle E_{abs} \rangle$ is the average energy/unit area absorbed by target 102. Equation 2 can be iterated to solution. Alternatively, and in conjunction with this relationship, $\Delta R_i$ is expressed as a sum of spherical harmonics ($Y_{lm}$'s) and the coefficients varied so as to minimize $\sigma_{abs}^E/\langle E_{abs} \rangle$ (RMS of absorbed energy divided by the absorbed energy). During this computation, the reflectivity at all points on target surface 104 is held within physically realizable limits $R_{di}$ 0.4:0.8-0.9 for instance.

Figure 1B:
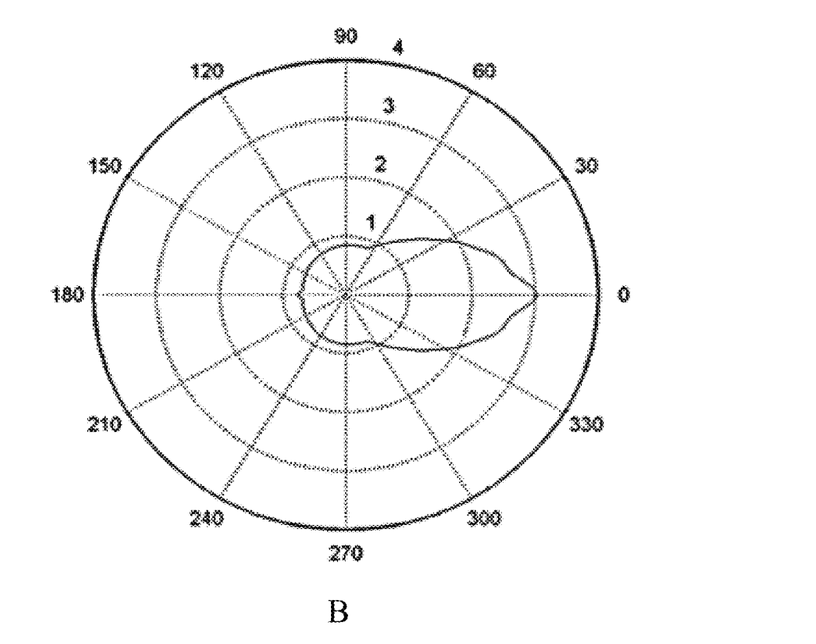
FIG. 1B shows a polar plot of $\Delta E_{abs}/\langle E_{abs}\rangle$ when the target has constant reflectivity $R_{di}$.
Figure 1C:
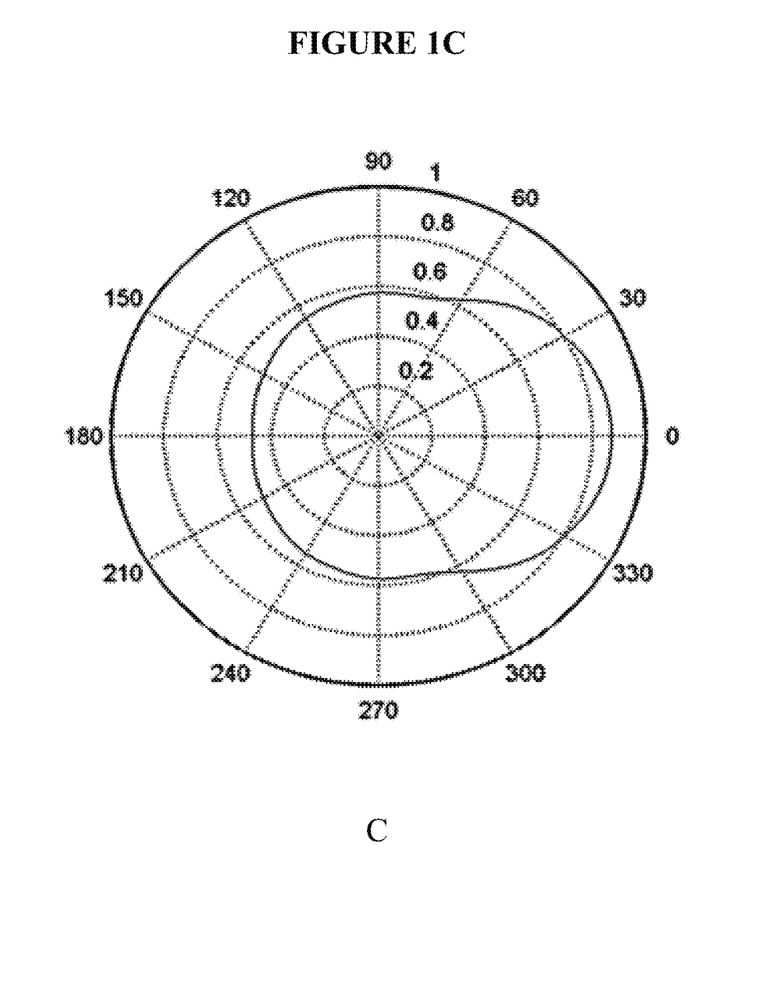
FIG. 1C shows a plot of the diffuse reflectivity $R_{di}$ ($\theta$, $\phi$) on the spherical target surface required to reduce $\sigma_{abs}^E/\langle E_{abs}\rangle \leq 1\%$.
Figure 2:
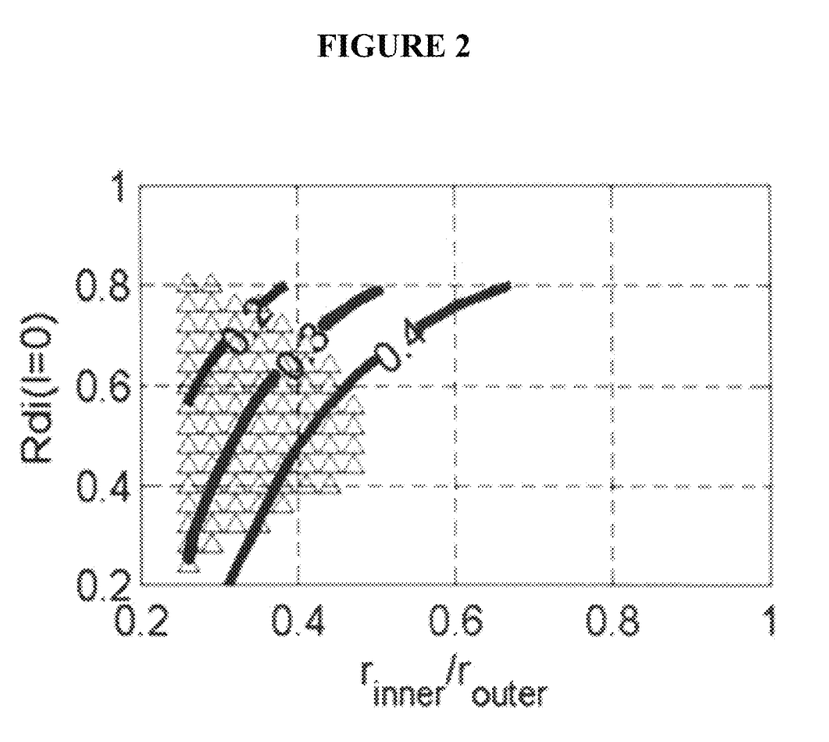
FIG. 2 plots the operating region for the arrangement of FIG. 2A where $\sigma_{abs}^E/\langle E_{abs}\rangle \leq 1\%$ overlaid with curves of constant absorption efficiency.

As a first example, beam 130 is incident on target assembly 100, enters hohlraum 110 through entrance aperture 114, is absorbed and reradiated by a volume absorber/radiator 120 resulting in an initial radiation pattern which in this example is approximated by a point source with angular distribution equal to the diffuse (Lambertian) reflection of a narrow beam at location of entrance aperture 114. Hohlraum inner wall surface 112 has a high constant diffuse reflectivity $R_{do}=0.9$ and spherical shape with radius $r_{outer}=1$ while target outer surface 104 has radius $r_{inner}=0.4$ and constant diffuse reflectivity ($R_{di}=0.6$). A polar plot (FIG. 1B) of $\Delta E_{abs}/\langle E_{abs} \rangle$ shows variations as large as 3:1 and RMS nonuniformity ($\sigma_{abs}^E/\langle E_{abs} \rangle$) of 40.6%. After optimizing the reflectivity of 104 by varying the reflectivity of the first 10 (l=1:10) Legendre modes while keeping the average ($R_{di}$ (l=0)=0.6) constant the nonuniformity $\sigma_{abs}^E/\langle E_{abs} \rangle$ is reduced to 0.6%, a 66-fold reduction. The resulting reflectivity profile (FIG. 1C) varies over the range $R_{min}$:$R_{max}$=0.47:0.87. This calculation can be repeated for a variety of geometries ($r_{inner}/r_{outer}$) and average target surface reflectivities ($R_{di}$(l=0)). FIG. 2 is the result of this calculation. The x-axis ($r_{inner}/r_{outer}$) is the relative size of target and hohlraum while the y-axis ($R_{di}$ (l=0)) is the average or l=0 diffuse target reflectivity. Triangles indicate ($R_{di}$(l=0)), $r_{inner}/r_{outer}$ values where $\sigma_{abs}^E/\langle E_{abs} \rangle$ can be reduced to 1% or less by varying the first 10 (l=1:10) Legendre modes. The solid lines labeled 0.2, 0.3 etc. are contours of constant target absorption efficiency ($\langle E_{abs} \rangle/E_{total}$ where $E_{total}$=total energy initially reradiated by volume absorbers 120). As we see from the figure, net absorption efficiencies as high as 45% with absorption uniformities <1% are achievable with a single narrow incident beam. This is probably the most asymmetric geometric situation involving a concentric spherical target and hohlraum. More symmetric initial configurations lead to better results (wider operating window and greater energy deposition uniformity).

Another single sided illumination geometry (FIG. 3A) comprises an annular beam 302 incident on the north pole side of hohlraum 110 at θ=124°, which passes through entrance aperture 114 to the opposite wall, is reradiated by a volume absorber (not shown) resulting in an initial intensity equivalent to the diffuse Lambertian reflection of annular ring 302 on the wall opposite entrance aperture 114. Target/hohlraum assembly 100 consists of concentric spheres. As above, varying the first 10 reflectivity Legendre modes of outer target surface 104 at a variety of geometries ($r_{inner}/r_{outer}$) and l=0 mode reflectivities ($R_{di}$(l=0)) results in a wider operating envelope (FIG. 4B) where $\sigma_{abs}^E/\langle E_{abs} \rangle<1\%$ (triangles). Curves of constant ($\langle E_{abs} \rangle/E_{total}$ overlay the operating envelope. The resulting operating envelope goes out to absorption efficiencies as high as ≈55%.

Figure 3A:
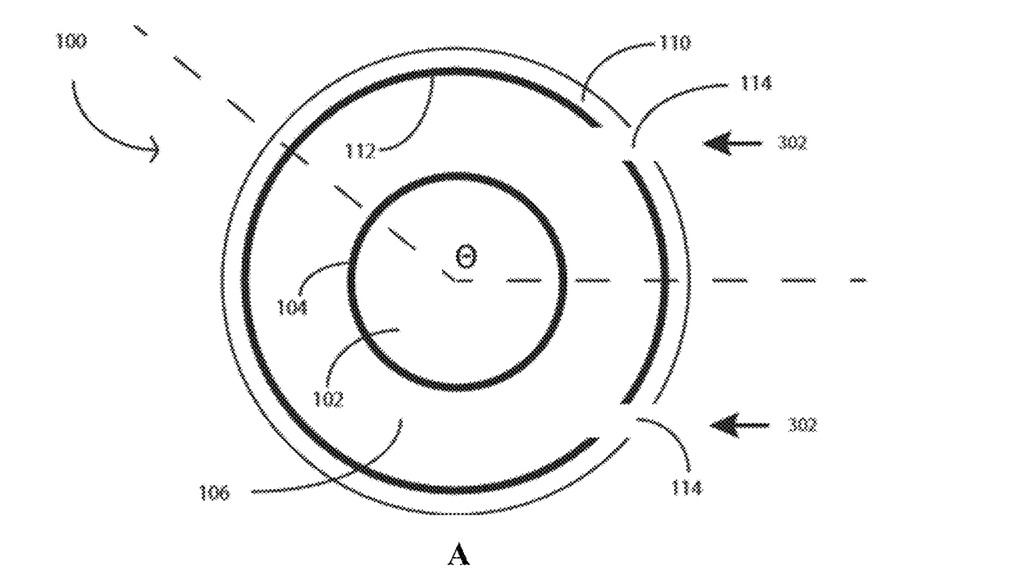
FIG. 3A shows a single annular beam illuminating a spherical target enclosed by a spherical hohlraum.
Figure 3B:
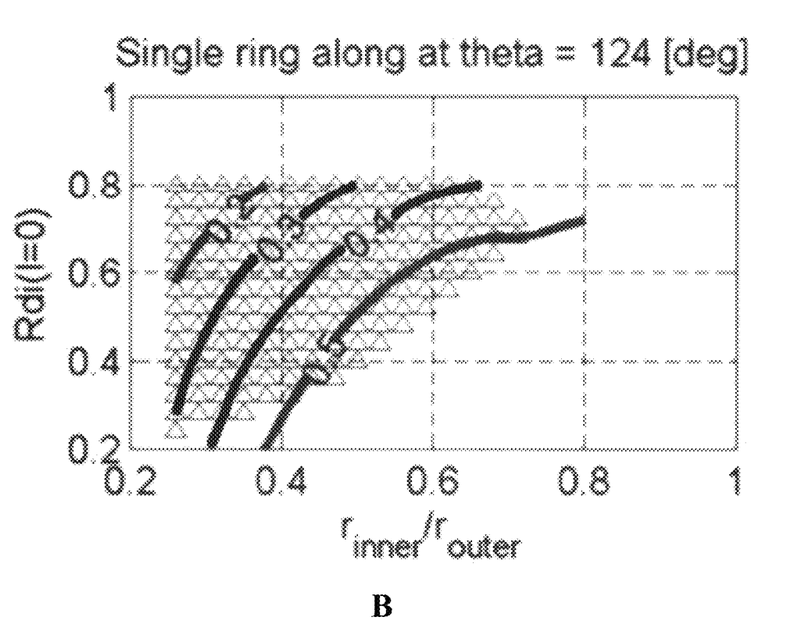
FIG. 3B plots the operating region for the arrangement of FIG. 3A where $\sigma_{abs}^E/\langle E_{abs}\rangle \leq 1\%$ overlaid with curves of constant absorption efficiency.
Figure 4:
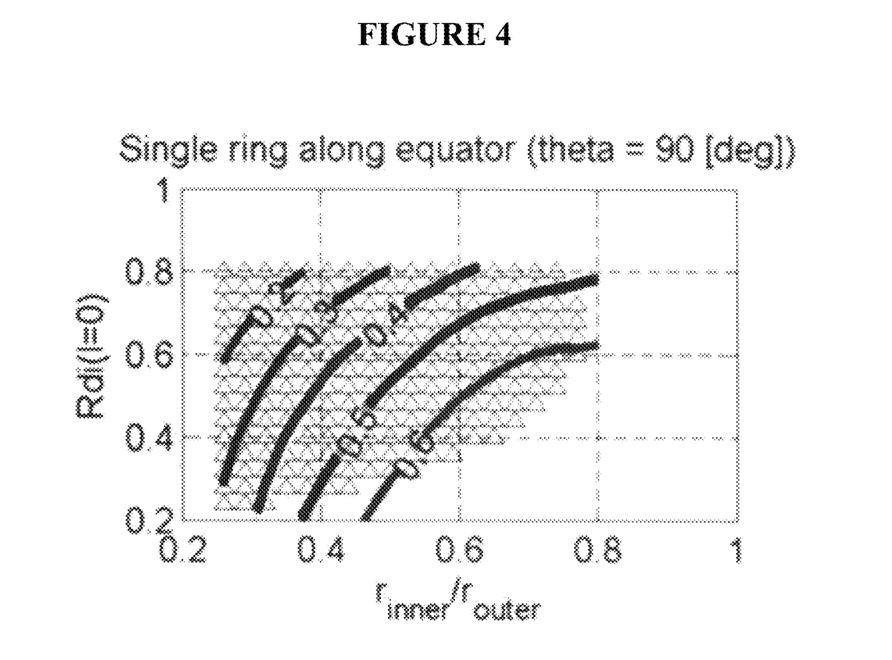
FIG. 4 plots the operating region where $\sigma_{abs}^E/\langle E_{abs}\rangle \leq 1\%$ overlaid with curves of constant absorption efficiency for an annular beam incident on the equator of a spherical target inside a spherical hohlraum.

Yet another single sided illumination geometry (not shown) is similar to the annular illumination arrangement of FIG. 3A but differs by having the annular beam incident on the equator (θ=90°) of the hohlraum inner wall instead of θ=124°. In practice this would be accomplished by a circumferential structure on the hohlraum wall acting as an effective volume radiator. Repeating the calculations outlined above (l=1:10 mode reflectivity variation) results (FIG. 4) in a still wider 1% operating window and absorption efficiencies as high as ≈65%.

Figure 5A:
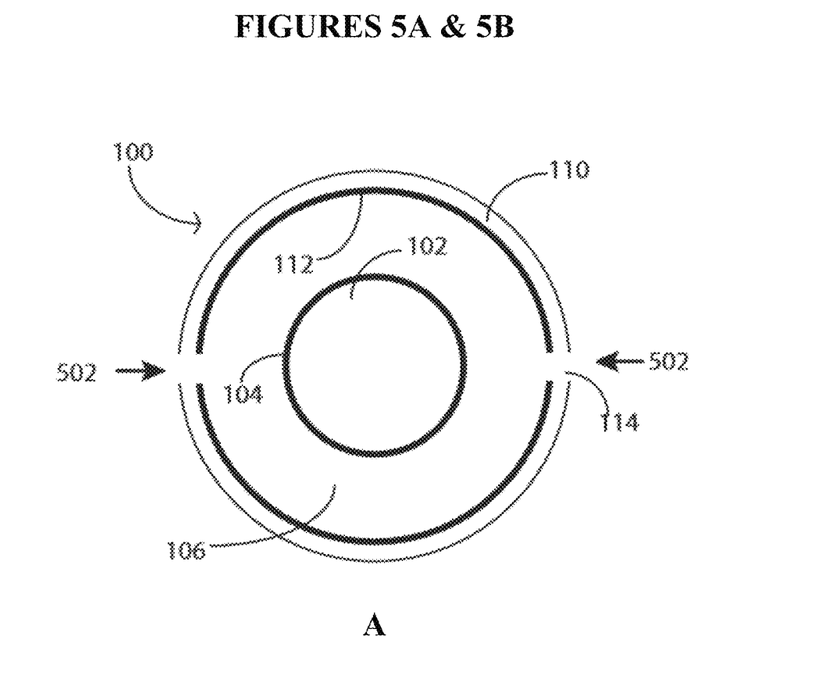
FIG. 5A shows two narrow beams incident on the north and south poles of a spherical hohlraum enclosing a spherical target.
Figure 5B:
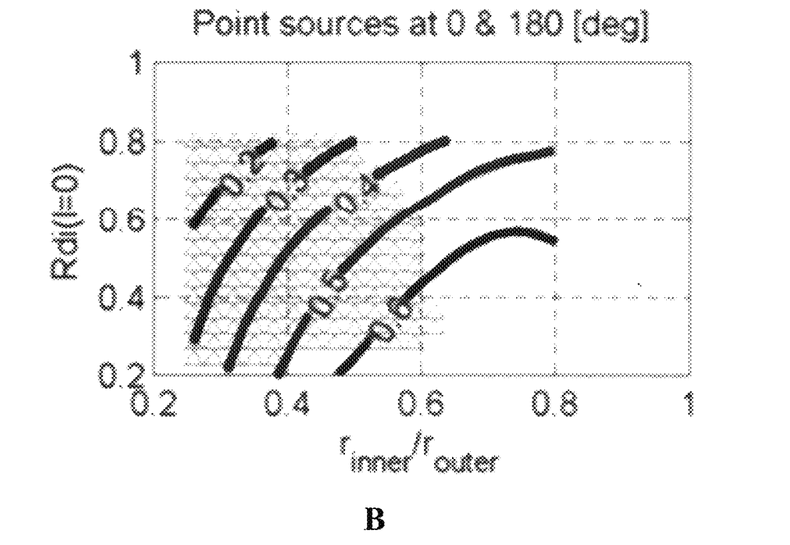
FIG. 5B plots the operating region for the arrangement of FIG. 5A where $\sigma_{abs}^E/\langle E_{abs}\rangle \leq 1\%$ overlaid with curves of constant absorption efficiency.

The simplest two sided illumination geometry (FIG. 5A) generalizes the single sided geometry (FIG. 1A) in having two narrow, equal intensity beams 502 incident on opposite sides of spherical hohlraum 110. Repeating the calculations above results in an operating window (FIG. 5B) with absorption efficiencies as high as ≈60+%.

Figure 6:
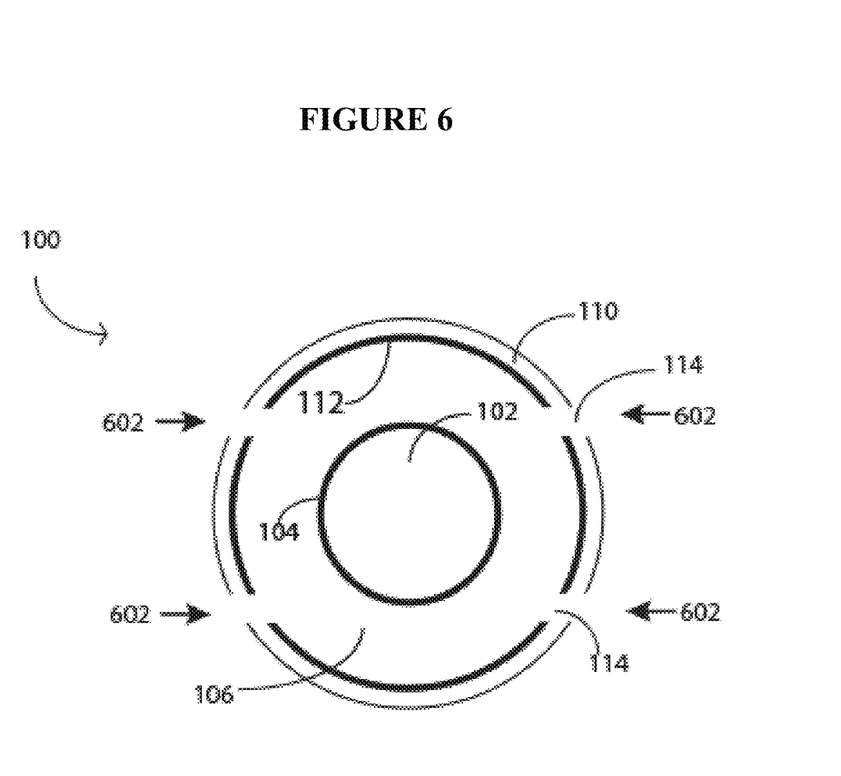
FIG. 6 shows two annular beams incident from opposite directions on a spherical hohlraum enclosing a spherical target.

FIG. 6 generalizes the one sided annular beam geometry of FIG. 4A by having two equal intensity annular beams incident 602 at mid latitude positions θ=56° and 124°. This arrangement has higher achievable absorption efficiencies (≈67+%) and a wider operating window where $\sigma_{abs}^E/\langle E_{abs} \rangle<1\%$.

Figures 7A, 7B:
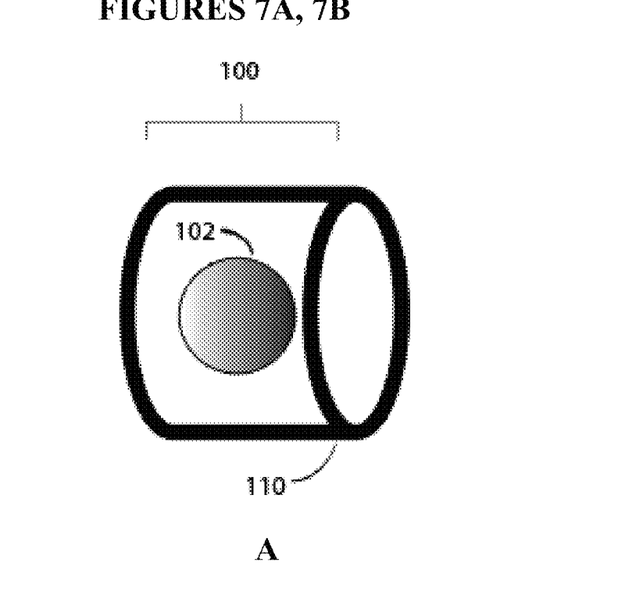
FIG. 7A is a perspective view of a spherical target enclosed by a cylindrical hohlraum.
FIG. 7B is a side, cutaway view of the arrangement of FIG. 7A showing an annular beam incident on the target assembly.
Figure 7B:
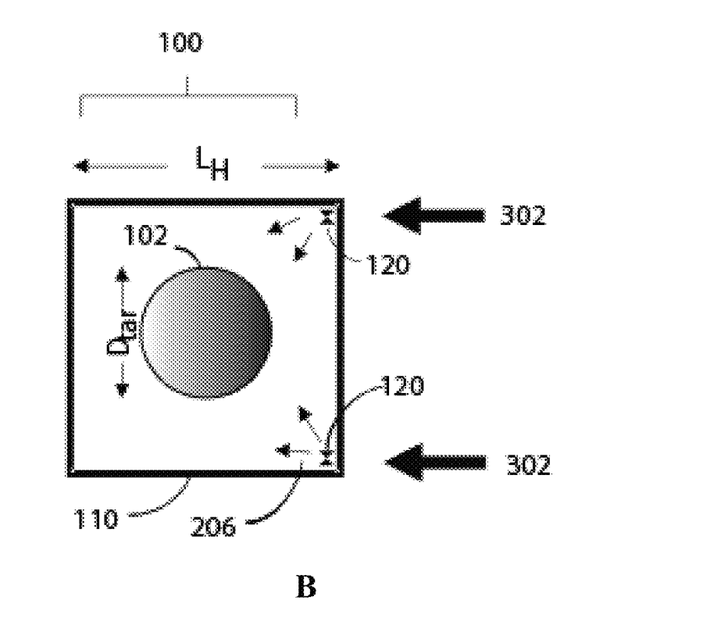
Figure 7C:
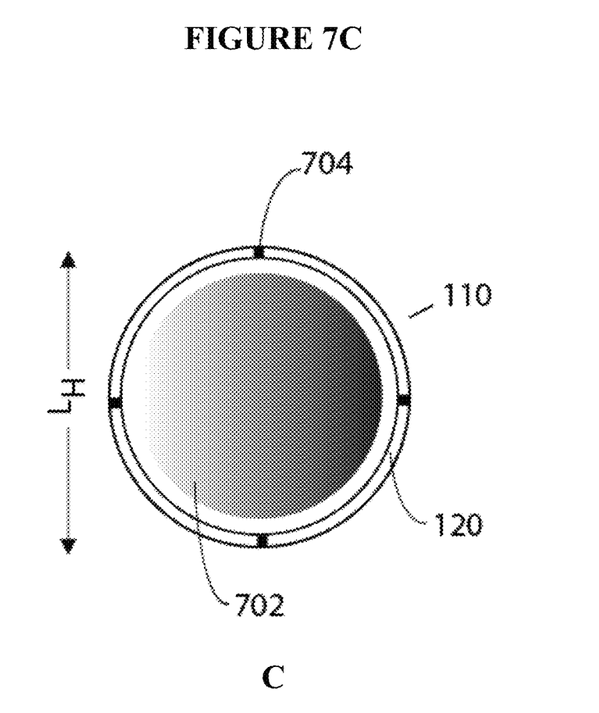
FIG. 7C is an end view of the arrangement of FIG. 7C showing the entrance aperture for the incident annular beam.

In another embodiment (FIGS. 7A-7C) a spherical target 102 is centered inside a cylindrical hohlraum 110 illuminated by an annular beam 302 (FIG. 7B) that is absorbed in volume absorber 120 (FIG. 7B) whose radiation 206 (FIG. 7B) then fills the interior of the hohlraum. FIG. 7B is a cutaway side view of target assembly 100 and FIG. 7C views target assembly 100 from the hohlraum circular face side and shows entrance aperture 114 and opaque face 702.

Figure 8A:
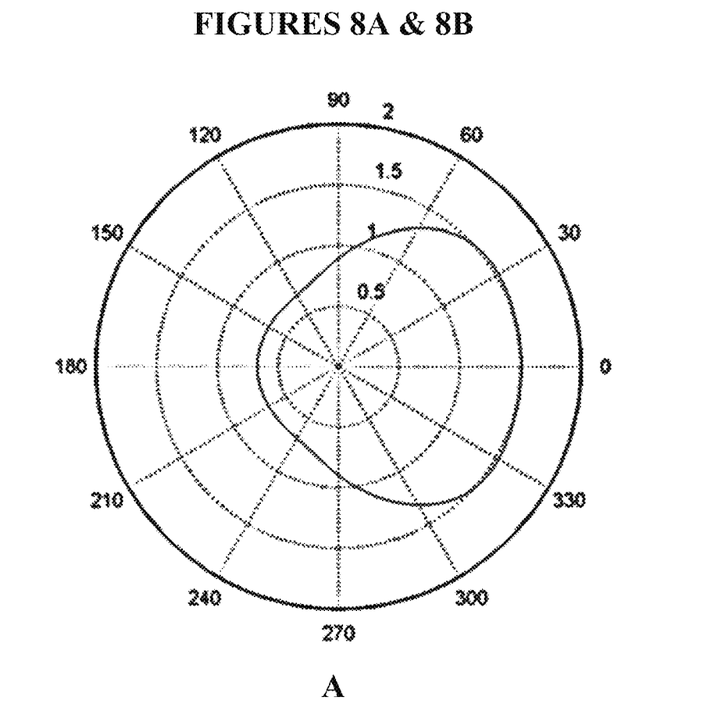
FIG. 8A is a polar plot of $\Delta E_{abs}/\langle E_{abs}\rangle$ when target of FIG. 7A has constant reflectivity $R_{di}$.
Figure 8B:
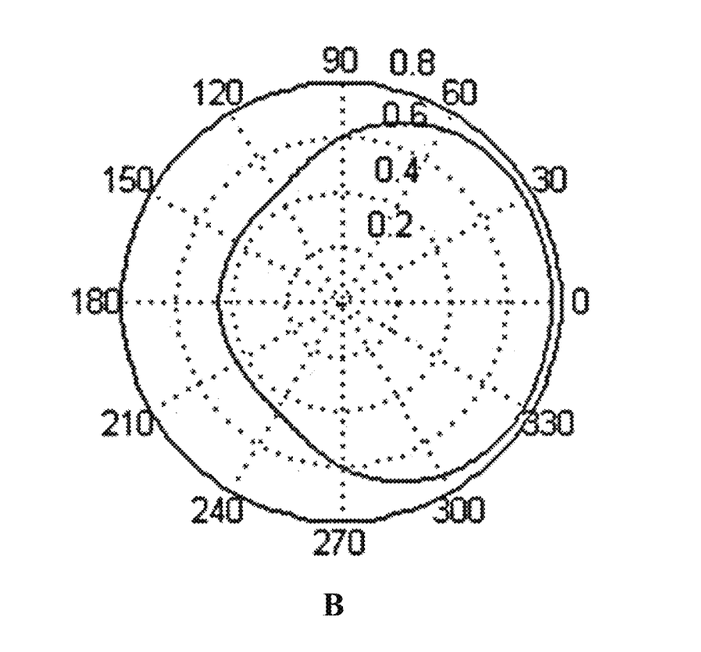
FIG. 8B shows a plot of the diffuse reflectivity $R_{di}$ ($\theta$, $\phi$) on the spherical target of FIG. 7A required to minimize $\sigma_{abs}^E/\langle E_{abs}\rangle$.

As a specific example of optimizing the reflectivity of the target $L_H/D_{tar}=D_H/D_{tar}=2$, FIG. 8A shows a polar plot of the non-uniformity $\Delta E_{abs}/\langle E_{abs} \rangle$ for an uncompensated target. In this case, $\sigma_{abs}^E/\langle E_{abs} \rangle=34\%$. After adjusting the reflectivity of target 102 for low order modes l=1:10 (FIG. 8B is the calculated reflectivity), the non-uniformity drops to $\sigma_{abs}^E/\langle E_{abs} \rangle=0.13\%$, a 260× reduction. More complex illumination geometries involving narrow beams, multiple annular beams and combinations thereof can also have their target reflectivity optimized. So far the specific calculations displayed have cylindrical symmetry and we only needed to vary the spherical harmonics $Y_{l,m=0}(\theta, \phi) \sim P_l(\theta)$ along the axis of symmetry. Indeed, for the sphere in cylinder calculation (illustrated in FIGS. 7A, B, and C), the obscuration effects of the four supporting tabs (704, FIG. 7C) were ignored. Including their effect requires us to utilize spherical harmonics, $Y_{lm}$'s with m≠0. This will be the case in more general illumination geometries.

Figure 9A:
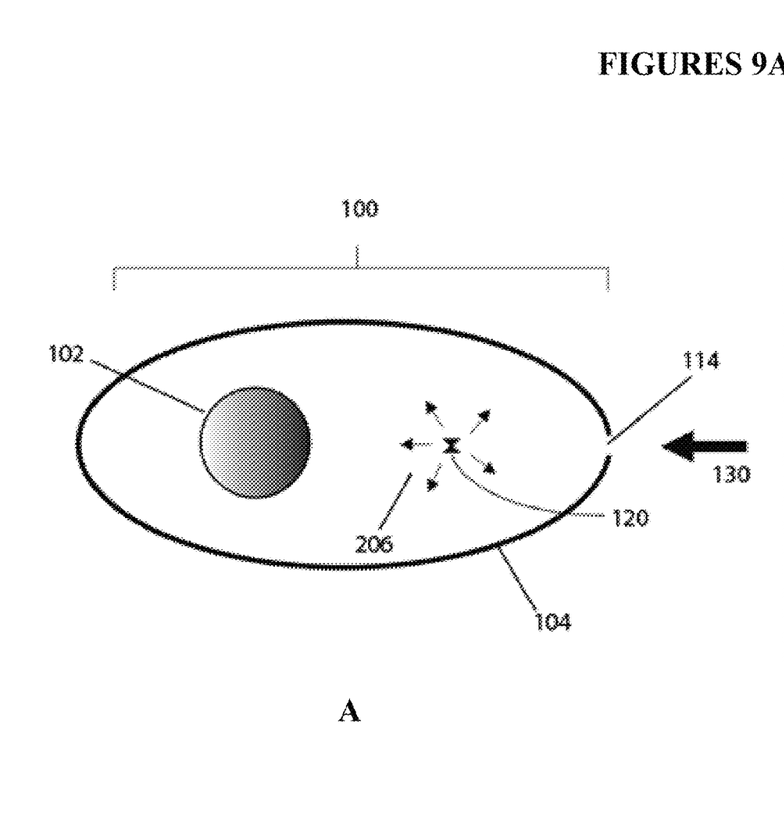
FIG. 9A shows a spherical target enclosed by an elliptical or ellipsoidal hohlraum.
Figure 9B:
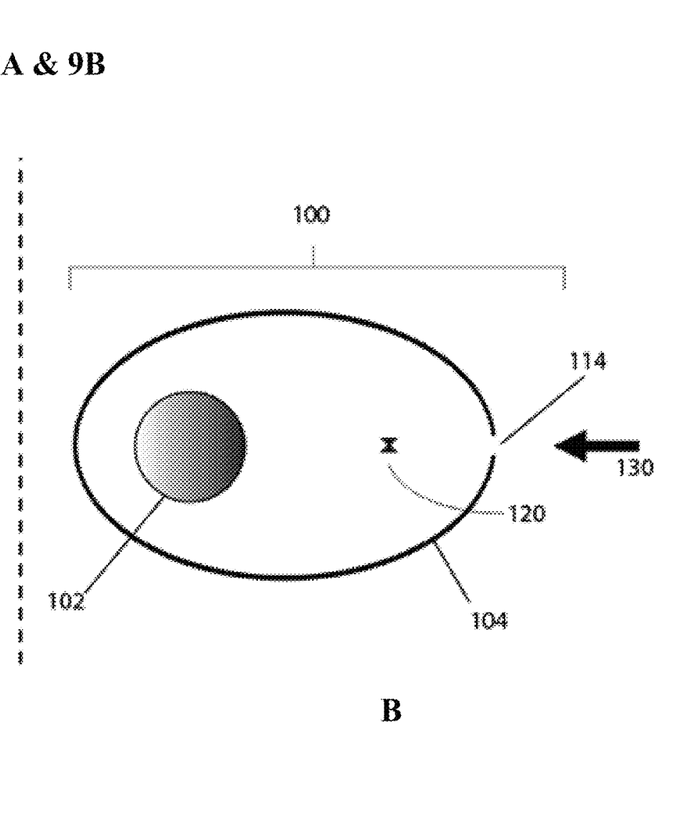
FIG. 9B shows a spherical target enclosed by a general rotationally symmetric hohlraum.

Beyond cylindrical and spherical hohlraums, this technique also applies to elliptical (FIG. 9A) or more generally shaped hohlraums 110 (FIG. 9B). Both arrangements feature a spherical target 102 inside a hohlraum 110 with volume absorbers 120 that absorb energy from incident beam 130 and reradiate it typically as X-rays 206. Volume absorber/radiator 120 is set away from beam entrance aperture 114 to minimize losses from radiation reflected or otherwise generated by volume absorbers 120.

As described above in detail for some simple geometries we can also greatly decrease $\sigma_{abs}^E/\langle E_{abs}\rangle$ in more general target assembly geometries, including asymmetric hohlraums and targets. Also, any incident radiation condition whose spatial and angular radiation characteristics are known in advance can be compensated for to greatly decrease $\sigma_{abs}^E/\langle E_{abs}\rangle$. This includes finite area, unequal intensity beams.

In another aspect of this invention (generally referring to FIGS. 9A and 9B) by itself or in addition to varying the reflectivity of target surface 104, we can vary the reflectivity of inner hohlraum surface 112. Although, and this was noted above, varying this reflectivity has less direct effect on reducing target $\Delta E_{abs}$, it can be utilized to reduce the amplitudes of some of the lower order (l<~3) modes, thus simplifying the physical implementation of target surface reflectivity variation.

In still another aspect of this invention, the shape of hohlraum inner surface 112 can be varied and this can be helpful in reducing the total required variation ($\max|_{\theta,\varphi}(R_{di}(\theta, \varphi))-\min|_{\theta,\varphi}(R_{di}(\theta, \varphi))$) of the target surface reflectivity.

The calculations presented so far utilized a time independent view factor calculation assuming a very short (delta function) beam temporal pulse length. The validity of these calculations was verified using time dependent view factor calculations with a non-zero pulse length.

Figure 10:
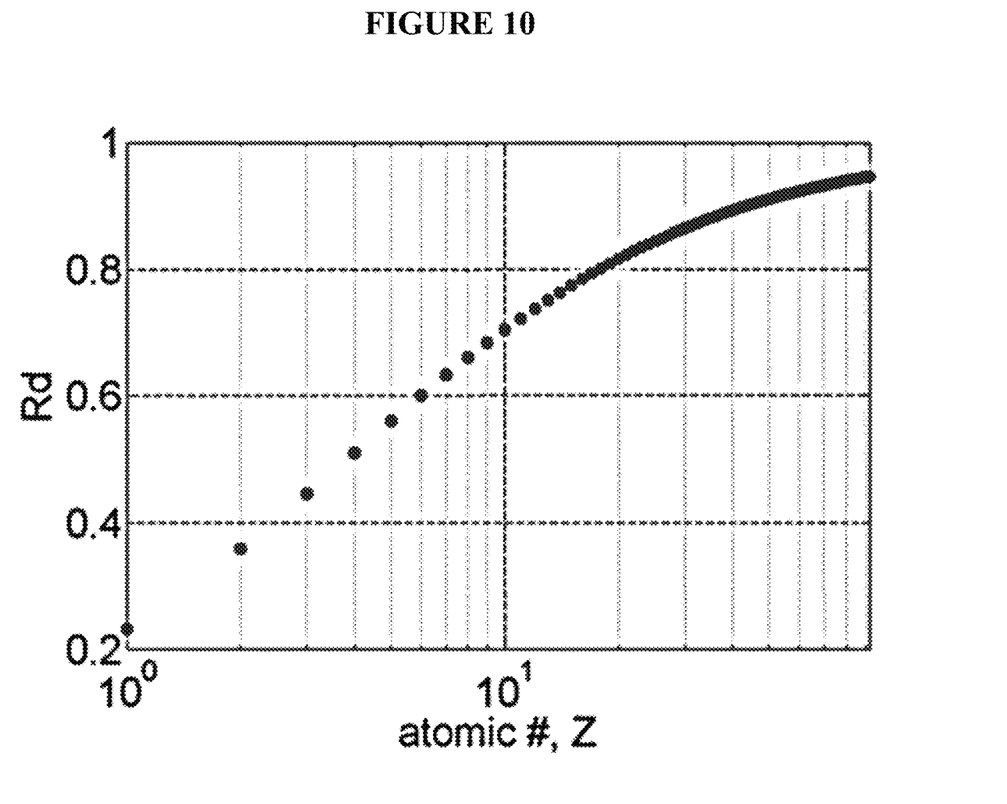
FIG. 10 is a plot of the diffuse soft X-ray reflectivity as a function of atomic number.
Figure 11:
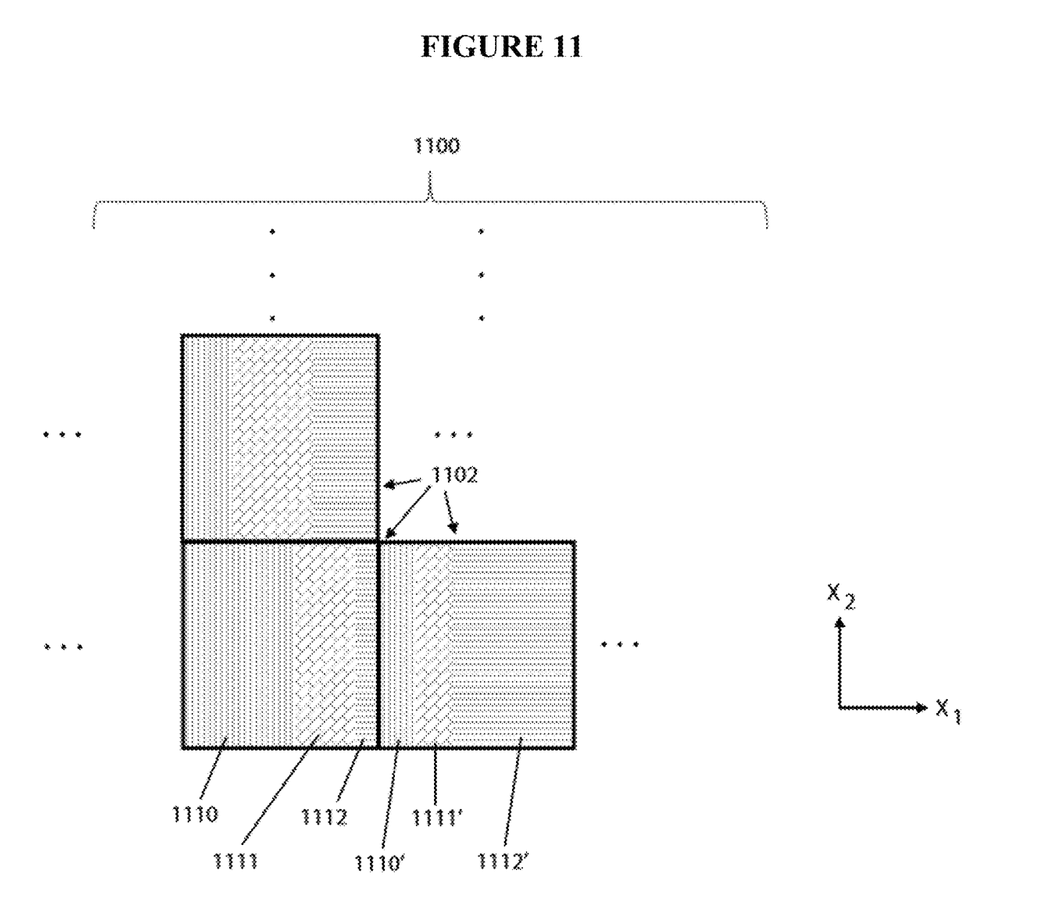
FIG. 11 shows a surface tessellation consisting of three materials in amounts that vary tile by tile.

Spatial variation of $R_d$ (on target or hohlraum surface) requires a corresponding variation in materials. FIG. 10 shows an approximation (adapted from Murakami & Meyerter-Vehn, indirectly driven targets for inertial confinement fusion, Nuclear Fusion, v31, pg. 1132-1145) for the soft X-ray diffuse reflectivity of various materials as a function of Z. While simple and neglecting spectral effects it shows the systematic trends with atomic number Z. Because of the gap, G, between hohlraum inner surface and target surface the hohlraum reflectivity, $R_{do}(\vec{x})$, can vary discontinuously on scales $\Delta l(\vec{x})|<L_{cell}$~G/10 and not significantly imprint $\Delta E_{abs}(\vec{x})$ Because of this, we can modulate $R_{do}(\vec{x})$ by using two or more materials discretely deposited in different proportions over cells of one or more shapes to tessellate or otherwise cover the hohlraum surface. A sample tessellation 1100 (FIG. 11) consisting of rectangular cells 1102 with transverse dimension ~$L_{cell}$ and within each cell three materials (vertical lines 1110, diagonal hatching 1111, horizontal lines 1112) are deposited in discrete regions in different proportions (1110, 1111, 1112 vs 1110', 1111', 1112'). The different proportions of material in each cell result in a different average diffuse reflectivity over each cell which can be continuously varied by changing the size of individual material regions (1110, 1111, 1112). Of course, we could tessellate the hohlraum in other patterns utilizing one or more sized/shaped cells 1102. This spatial tessellation with discrete material regions can be used on the target surface but the cell size, $L_{cell}$, is dictated by the transverse (perpendicular to surface normal) mixing length ($L_{Xmix}$) which is typically «G.

If we cannot vary the target surface reflectivity ($R_{di}(\theta, \varphi)$) using discrete tessellation, then thin lamina consisting of two or more materials are deposited in alternating layers whose thickness varies continuously with position ($\theta, \varphi$) on the target surface.

Figure 12A:
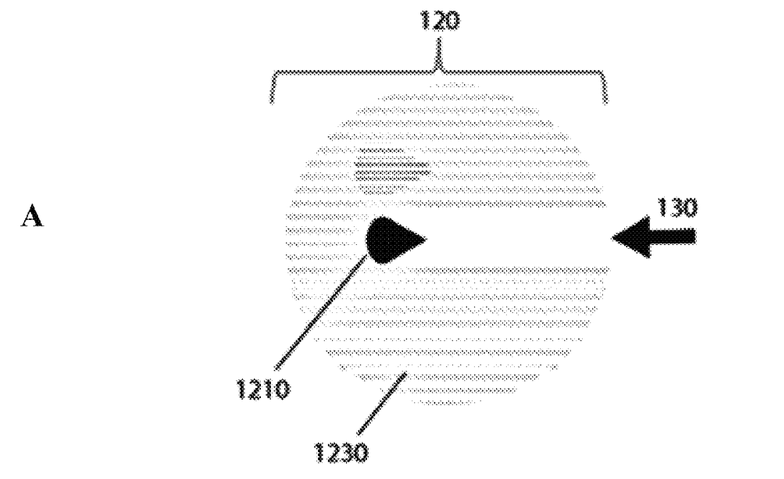
FIG. 12A is one version of a volume radiator/absorber.
Figure 12B:
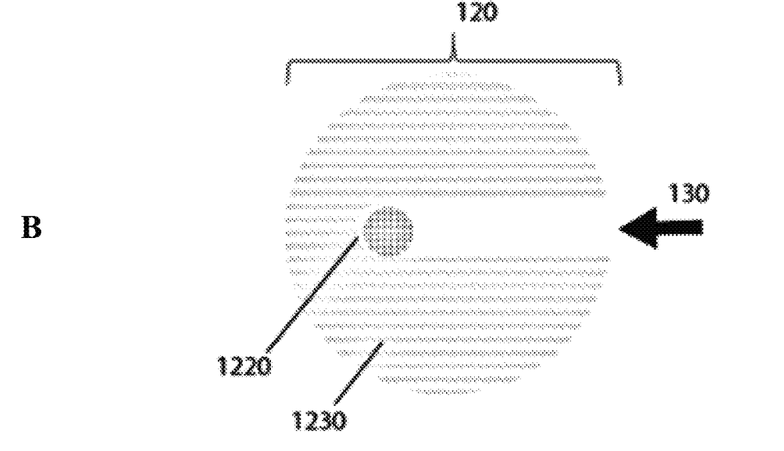
FIG. 12B is another version of a volume radiator/absorber.
Figure 12C:
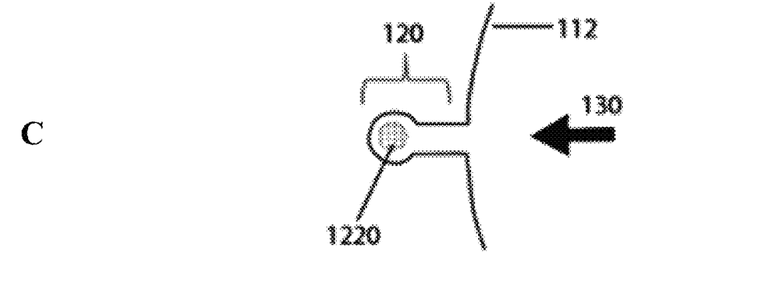
FIG. 12C is a volume radiator/absorber embedded in a hohlraum wall.

In the foregoing we have referred to volume absorbers or volume radiators 120. FIGS. 12A-C illustrate some forms they can take. In FIG. 12A incident light beam 130 impinges on volume radiator 120. Within the non-convex beam trap/re-radiator lies a material having a wedged geometry 1210 forcing any specular reflection component to be directed away from entrance hole (not shown) for beam 130. Any light absorbed by material 1210 is isotropically re-radiated. FIG. 12B illustrates another volume radiator 120 combining the non-convex geometry of 1230 with an under dense foam blob 1220 that acts as an absorber and local re-radiator. The arrangement of FIG. 12C embeds under dense foam blob 1220 in a non-convex cavity within the inner hohlraum wall 112.

In yet another aspect of this invention, volume absorbers embedded within hohlraum wall 112 (as in FIG. 12C) can have their absorptivity varied to compensate for hohlraum geometry and source intensity.

As an example, in a target assembly (FIG. 13), higher pushing efficiency for shells may be realized by tamping the heated region that is produced by laser and/or X-ray irradiation of an ICF target. The overall uniformity is critical to the pushing pressure profile. Also, tailoring the properties of the radiators 1314, such as the opacity and/or density, may be utilized to produce a uniform pushing profile with a non-uniform local deposition ratio into the propellant region 1312. The radiators may also be graded to make the pushing profile more uniform.

Figure 13:
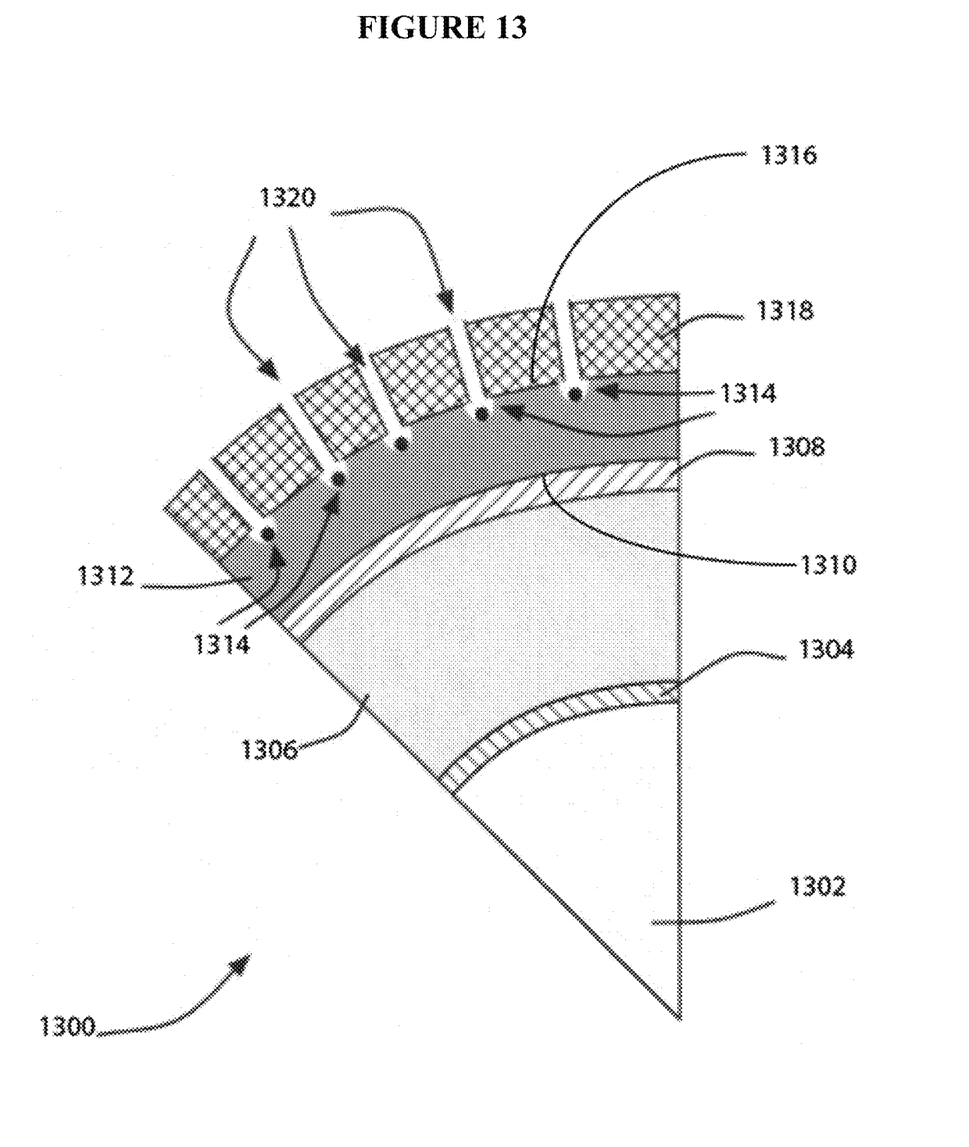
FIG. 13 shows a target assembly containing a propellant region.

Target assembly 1300 comprises a central spherical fuel region, the inner fuel region 1302. Surrounding the inner fuel region 1302 is an inner shell 1304 and outer shell 1308. In the space between the inner shell 1304 and outer shell 1308 is an outer fuel region 1306. Surrounding the outer shell 1308 is a propellant region 1312. A plurality of gold foam radiators 1314 are arranged in a one-to-one correspondence with the cylindrical beam channels 1320 located in case 1316. The cylindrical beam channels 1320 completely penetrate through case 1316. Relative to ICF target assembly previously discussed, case 1316 may be considered analogous to the hohlraum (110, FIG. 1) and propellant region 1312 may be considered analogous to the vacuum or gas-filled space 106 (FIG. 1) between the hohlraum inner wall 112 (FIG. 1) and target outer wall 104 (FIG. 1).

In another variation of this invention, FIG. 14, when the space 1312 between target outer surface 1310 and hohlraum or case inner wall 1302 is filled with propellant as described above, one or both surfaces (1302 or 1310) can have their diffuse reflectivity varied to adjust out non-uniformities in energy absorbed on target surface 1310. In this case, calculations determining the required diffuse reflectivity or hohlraum shaped profiles may utilize more sophisticated view factor methods or the full time-dependent radiative transport equations.

Additionally, the embodiments discussed in this application are exemplary and not an exhaustive enumeration of variants. Features discussed as part of separate embodiments may be combined into a single embodiment. Further, embodiments may make use of other features known in the art but not explicitly cited in this application.

The invention claimed is:

1. A system for controlling energy deposition on a surface of an Inertial Confinement Fusion (ICF) target when imploding, the system comprising:
   a hohlraum;
   an ICF target located within said hohlraum;
   a plurality of openings within said hohlraum, each opening configured to receive an incident beam;
   a plurality of spherical-shaped volume absorber/radiators, wherein each of the volume absorber/radiators is located within a propellant region positioned outside of said ICF target but within said hohlraum, and each the volume absorber/radiators are positioned to respectively align in a one-to-one correspondence with each of the openings of said hohlraum, and each of the volume absorber/radiators is configured to absorb and reradiate an incident beam as x-ray radiation; and wherein an outer surface of said ICF target or an inner surface of said hohlraum has a plurality of materials deposited thereon, the plurality of materials comprises different materials, and each of the different materials varies in thickness.

2. The system as in claim 1, wherein each of the plurality of volume absorber/radiators are located at a distance separated from the plurality of openings to minimize losses from the x-ray radiation reflected or generated by the plurality of volume absorber/radiators.

3. The system as in claim 1, wherein each of the plurality of volume absorber/radiators is located directly adjacent, and in one-to-one correspondence, to the plurality of openings.

4. The system as in claim 1, wherein each of the plurality of volume absorber/radiators have different concentrations, opacities, or densities.

5. The system as in claim 1, further comprising:
one or more shapes located on the hohlraum inner surface or target outer surface, wherein each of the plurality of materials are discretely and uniquely deposited over cells of the one or more shapes to tessellate the hohlraum inner surface or target outer surface.

6. The system of claim 5, wherein said one or more shapes comprises rectangular cells extending in a transverse dimension across the hohlraum inner surface or target outer surface, wherein said one or more shapes include diagonal hatching, horizontal lines and vertical lines which are deposited in discrete regions and in different proportions within each rectangular cell.

7. The system as in claim 1, further comprising two or more materials of lamina deposited in alternating layers with a continuously varying thickness across the outer surface of said ICF target or inner surface of said hohlraum.

8. The system as in claim 1, wherein the plurality of materials vary in reflectivity properties.

9. A method of controlling energy deposition on a surface of an Inertial Confinement Fusion (ICF) target when imploding, the method comprising:
inserting an ICF target within a hohlraum;
providing a plurality of openings within said hohlraum to receive an incident beam,
wherein an outer surface of said ICF target or an inner surface of said hohlraum has a plurality of materials deposited thereon,
the plurality of materials comprises different materials,
and each of the different materials varies in thickness;
providing a plurality of spherically-shaped volume absorber/radiators,
wherein each of the volume absorber/radiators is located within a propellant region positioned outside of said ICF target but within said hohlraum,
the volume absorber/radiators are positioned to respectively align in a one to one correspondence with each of the openings of said hohlraum, and
each of the volume absorber/radiators is configured to absorb and reradiate an incident beam as x-ray radiation;
receiving the incident beam upon the plurality of volume absorber/radiators;
with the volume absorber/radiators, absorbing the incident beams and reradiating x-ray radiation within said hohlraum;
accelerating inwardly a shell of said ICF target when hit by said x-ray radiation;
compressing a fuel region within said shell of said ICF target by the inward acceleration of said shell; and
suppressing non-uniformities in the x-ray radiation emitted from the plurality of volume absorber/radiators upon the plurality of materials located on the outer surface of said ICF target or on the inner surface of said hohlraum.

10. The method as in claim 9, further comprising irradiating an annular beam of radiation through an annular ring-shaped aperture and impinging the annular ring-shaped beam of radiation upon an annular ring-shaped volume absorber/radiator.

11. The method as in claim 9, further comprising minimizing losses from the x-ray radiation reflected or generated by the plurality of volume absorber/radiators by placing each of the plurality of volume absorber/radiators at a distance separated from the plurality of openings.

12. The method as in claim 9, further comprising receiving the incident radiation upon each of the plurality of volume absorber/radiators directly adjacent, and in one-to-one correspondence, to the plurality of openings.

13. The method as in claim 9, further comprising suppressing nonuniformities of the x-radiation by varying the concentration of each of the plurality of spherically-shaped volume absorber/radiators.

14. The method as in claim 13,
wherein the step of varying the concentration of the volume absorber/radiators comprises
providing rectangular cells extending in a transverse dimension across the hohlraum inner surface or target outer surface, and
including diagonal hatching, horizontal lines, and vertical lines which are deposited in discrete regions and in different proportions within each rectangular cell.

15. The method as in claim 9, further comprising suppressing nonuniformities of the x-ray radiation as it interacts with each of the plurality of materials that are discretely and uniquely deposited in different proportions over cells of one or more shapes to tessellate the hohlraum inner surface or target outer surface.

16. The method as in claim 9, wherein the step of suppressing includes
suppressing nonuniformities in the x-ray radiation as it interacts with two or more materials in a lamina, less than 100 microns, deposited in alternating layers with a continuously varying thickness across the outer surface of said ICF target or the inner surface of said hohlraum.

17. The method as in claim 9, further comprising reducing the variation in energy deposition on said ICF target by varying the reflectivity of each of the plurality of materials.

* * * * *